United States Patent
Everitt et al.

(10) Patent No.: US 10,990,515 B2
(45) Date of Patent: *Apr. 27, 2021

(54) AUTOMATED UNIT TESTING IN A MAINFRAME ENVIRONMENT

(71) Applicant: Compuware Corporation, Detroit, MI (US)

(72) Inventors: Glenn Everitt, Waterford, MI (US); Douglas McLeod Watkins, Commerce Township, MI (US); Loretta Ann Walbeck, Brighton, MI (US); Sheldon John Spurrell, Brighton, MI (US); Steven James Carr, Northville, MI (US)

(73) Assignee: BMC Software, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/700,261

(22) Filed: Dec. 2, 2019

(65) Prior Publication Data

US 2020/0104249 A1 Apr. 2, 2020

Related U.S. Application Data

(63) Continuation of application No. 15/913,159, filed on Mar. 6, 2018, now Pat. No. 10,528,457.

(Continued)

(51) Int. Cl.
*G06F 9/44* (2018.01)
*G06F 11/36* (2006.01)
(Continued)

(52) U.S. Cl.
CPC .......... *G06F 11/3688* (2013.01); *B32B 25/04* (2013.01); *C08K 3/38* (2013.01);
(Continued)

(58) Field of Classification Search
CPC ............... G06F 11/3688; G06F 11/362; G06F 11/3664; G06F 11/3684; G06F 16/188; G06F 16/252; G06F 40/205
See application file for complete search history.

(56) References Cited

U.S. PATENT DOCUMENTS 8,127,316 B1 * 2/2012 Binotto ................... G06F 21/51
719/331
2005/0015702 A1 * 1/2005 Shier .................... G06F 11/2273
714/776

(Continued)

*Primary Examiner* — Hang Pan

(57) ABSTRACT

An automated system is presented for unit testing an application in a mainframe execution environment. The system includes a test configurator, a stub setup routine and an interceptor routine. The test configurator is configured to receive and parse a test input file, where the test input file includes a record for a particular file accessed by the application using the given type of file system. Upon reading the record, the test configurator calls the stub setup routine. The stub setup routine is associated with the given type of file system and creates an object for the particular file in the mainframe execution environment, such that the object is instantiated from a class representing the given type of file system. The interceptor routine is accessible by the application. In response to a given command issued by the application for the given type of file system, the interceptor routine operates to interact with methods provided by the object.

17 Claims, 10 Drawing Sheets

Related U.S. Application Data

(60) Provisional application No. 62/623,760, filed on Jan. 30, 2018.

(51) Int. Cl.
  *G06F 16/188* (2019.01)
  *G06F 16/25* (2019.01)
  *G06F 40/205* (2020.01)
  *B32B 25/04* (2006.01)
  *C08K 3/38* (2006.01)
  *F16F 1/36* (2006.01)

(52) U.S. Cl.
  CPC .............. *F16F 1/36* (2013.01); *G06F 11/362* (2013.01); *G06F 11/3664* (2013.01); *G06F 11/3684* (2013.01); *G06F 16/188* (2019.01); *G06F 16/252* (2019.01); *G06F 40/205* (2020.01); *C08K 2003/387* (2013.01)

(56) References Cited

U.S. PATENT DOCUMENTS

| | | | | |
|---|---|---|---|---|
| 2005/0027470 | A1* | 2/2005 | Tonomura | G06F 11/3688 702/120 |
| 2005/0104859 | A1* | 5/2005 | Need | G06F 9/451 345/172 |
| 2006/0101476 | A1* | 5/2006 | Robert | G06F 11/3688 719/328 |
| 2009/0259699 | A1* | 10/2009 | Chasman | G06F 16/273 |

* cited by examiner

CALPRML_SCENARIO RESULT REPORT
Failures are anticipated and checked for in assertions
Errors are unanticipated problems TestProjectPrj_CALPRML_2018-02-26a

Test Suite Summary

| Name | Tests | Failures | Errors | Success rate | Time stamp | Job ID | System |
|---|---|---|---|---|---|---|---|
| CALPRML_Scenario | 289 | 1 | 0 | 99% | 2018-02-28 00:57:21 | PTXGXBDT[00366745] | CW01 LPAR |

Test Scenarios

| Name | Tests | Failures | Errors | Success rate |
|---|---|---|---|---|
| CALPRML_Scenario | 289 | 1 | 0 | 99% |

CALPRML_Scenario_Test_Scenario

Test Cases
CALPRML_Case1

CALPRMLCase1 Test Case Details

Output Assertion

| Assertion | Messages | Expected | Actual |
|---|---|---|---|
| No interface present | Testcase has no parameters to verify | | |

Stubs

| Stub | Target | Executed | Records | Assertion | Tests | Failures | Errors | Success rate |
|---|---|---|---|---|---|---|---|---|
| CALPRML_SYSPRINT_WRITE_01 | SYSPRINT | Y | 282 | Y | 3 | 1 | 0 | 100% |
| CALPRML_ASSOCIATELOCATORS_01_SQL_01 | Associatelocators | Y | 1 | Y | 1 | 0 | 0 | 100% |
| CAMPRML_C1_SQL_01 | Allocate | Y | 1 | Y | 283 | 0 | 0 | 100% |
| CAMPRML_CALL_GETPRML_1_SQL_01 | CALL | Y | 1 | Y | 1 | 0 | 0 | 100% |

| Stub | | |
|---|---|---|
| CALPRML_C1_SQL_01 | Execution Failure | The stub doesn't have a matching record (type: Fetch). |

FIG. 10A

| CALPRML_SYSPRINT_WRITE_01 Stub | | | | |
|---|---|---|---|---|
| Stub Record Assertion | Tests | Failures | Errors | Success rate |
| | 3 | 1 | 0 | 66% |
| No. 1  SYSPRINT record assertion result | | | | |
| No. 2  SYSPRINT record assertion result: No assertion executed | | | | |
| No. 3  SYSPRINT record assertion result: No assertion executed | | | | |
| CALPRML_ASSOCIATELOCATORS_1_SQL_01 Stub | | | | |
| Stub Record Assertion | Tests | Failures | Errors | Success rate |
| | 1 | 0 | 0 | 100% |
| No. 1  ASSOCIATELOCATORS assertion result | | | | |
| CALPRML_C1_SQL_01 Stub | | | | |
| Stub Record Assertion | Tests | Failures | Errors | Success rate |
| No. 1  Allocate assertion result | 1 | 0 | 0 | 100% |
| No. 2  Fetch assertion result | 1 | 0 | 0 | 100% |
| No. 3  Fetch assertion result | 1 | 0 | 0 | 100% |
| No. 4  Fetch assertion result | 1 | 0 | 0 | 100% |
| No. 5  Fetch assertion result | 1 | 0 | 0 | 100% |
| No. 6  Fetch assertion result | 1 | 0 | 0 | 100% |
| No. 7  Fetch assertion result | 1 | 0 | 0 | 100% |
| No. 8  Fetch assertion result | 1 | 0 | 0 | 100% |
| No. 9  Fetch assertion result | 1 | 0 | 0 | 100% |
| Prev 2 3 4 5 6 7 8 9 10 11 12 13 14 15 Next | | | | |
| CALPRML_CALL_GETPRML_1_SQL_01 Stub | | | | |
| Stub Record Assertion | Tests | Failures | Errors | Success rate |
| No. 1  CALL assertion result | 1 | 0 | 0 | 100% |

FIG. 10B

AUTOMATED UNIT TESTING IN A MAINFRAME ENVIRONMENT

CROSS-REFERENCE TO RELATED APPLICATION

This application is a continuation of U.S. patent application Ser. No. 15/913,159, filed on Mar. 6, 2018, which claims the benefit of U.S. Provisional Application No. 62/623,760, filed on Jan. 30, 2018. The entire disclosures of each of the above applications are incorporated herein by reference.

FIELD

The present disclosure relates to unit testing and in particular, automating unit testing an application in a mainframe environment.

BACKGROUND

Unit testing is an important part of application development because it enables developers to validate incremental code changes. However, much of the unit testing done today is manual, prompting developers to skip unit testing altogether, which can result in the use of poor quality code in subsequent testing phases, or worse, can negatively impact end-user experiences.

Unit testing allows developers to test programs with a "divide and conquer" approach; that is, test small portions of a program, as many times as necessary, to immediately ensure the program functions as it should prior to performing more complex, time consuming and costly tests. Automated unit testing significantly accelerates the testing process and enables IT to put regular code updates into production at a pace necessary for fast, frequent releases.

By automating unit testing, developers can immediately validate incremental changes to code, thus reducing the risk of introducing even slight defects into the code base that might not otherwise be caught until much later in the testing process when they will be much costlier to fix.

This section provides background information related to the present disclosure which is not necessarily prior art.

SUMMARY

This section provides a general summary of the disclosure, and is not a comprehensive disclosure of its full scope or all of its features.

An automated system is presented for unit testing an application in a mainframe execution environment. The system includes a test configurator, a stub setup routine and an interceptor routine. The test configurator executes in the mainframe execution environment. The test configurator is configured to receive and parse a test input file, where the test input file includes a record for a particular file accessed by the application using the given type of file system. Upon reading the record, the test configurator calls the stub setup routine. The stub setup routine is associated with the given type of file system and creates an object for the particular file in the mainframe execution environment, such that the object is instantiated from a class representing the given type of file system. The interceptor routine is accessible by the application. In response to a given command issued by the application for the given type of file system, the interceptor routine operates to interact with methods provided by the object.

The test input file includes one or more data records for the particular file such that the test configurator populates the object with data from the one or more data records.

During operation, the test configuration calls the application and thereby initiates testing of the application. The test configurator further operates to retrieve values for parameters of the application from the test input file and pass the values of the parameters to the application. Lastly, the application returns control to the test configurator and the test configurator retrieves values of the parameters from the application and generates a test output file, where the test output file includes the retrieved values of the parameters from the application.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
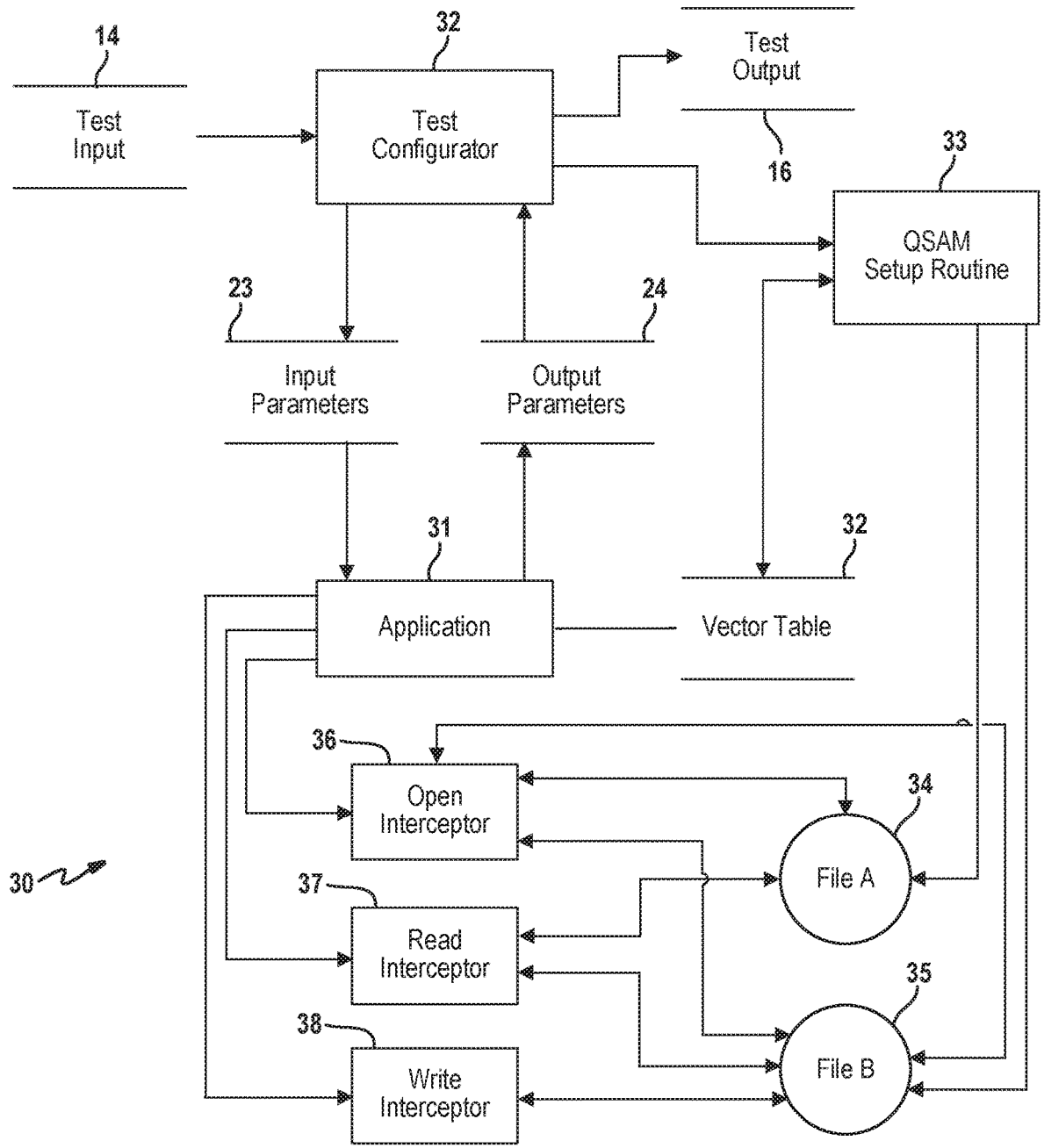
Figure 4:
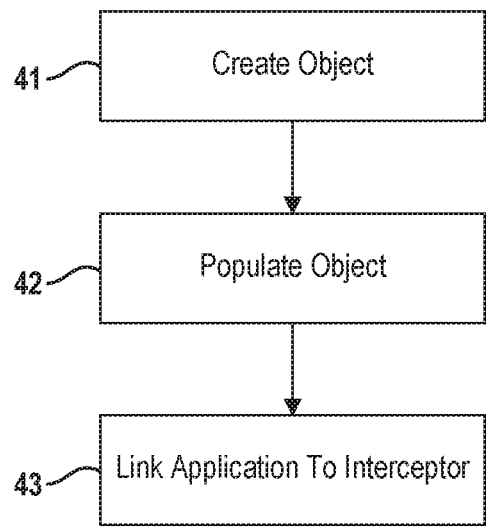
Figure 6:
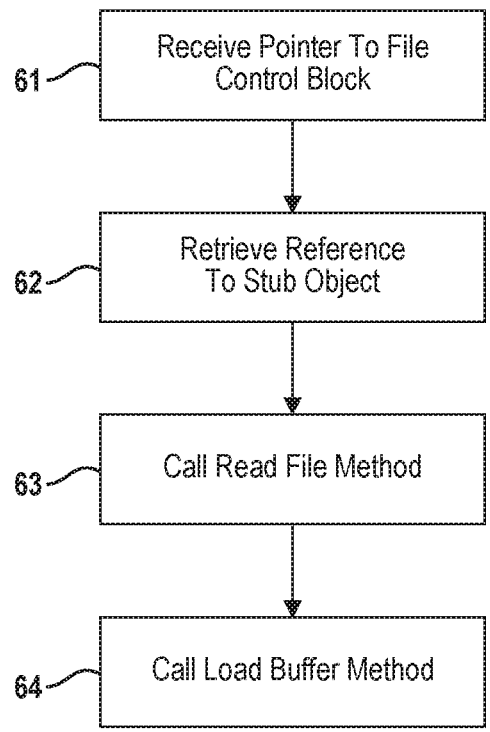
Figure 5:
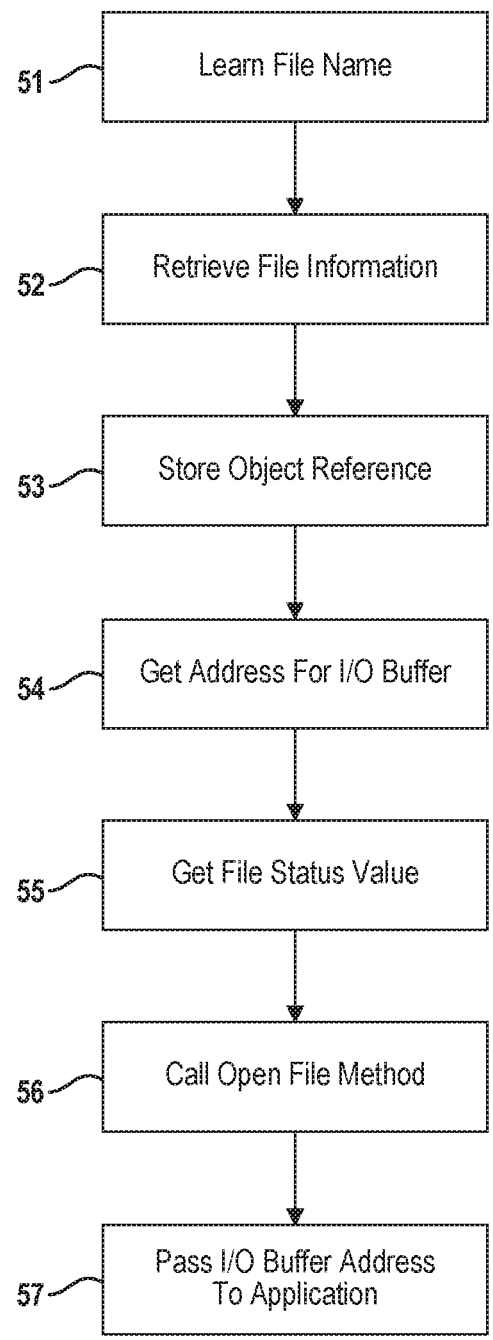
Figure 7:
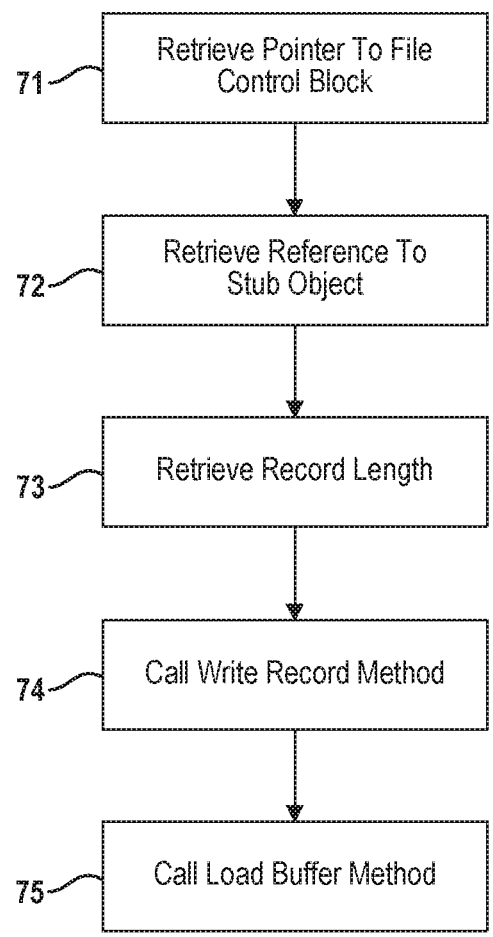
Figure 8:
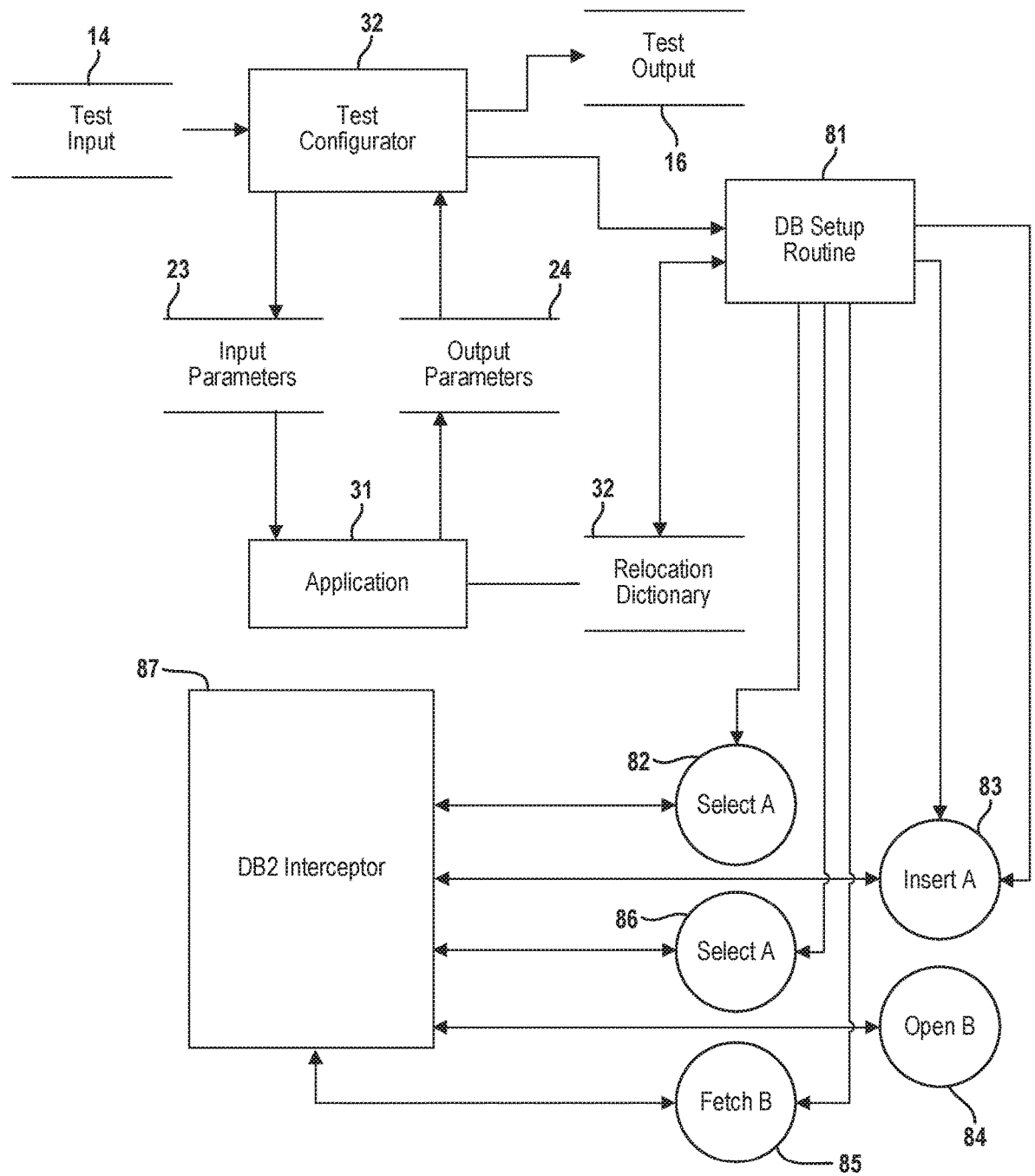
Figure 9:
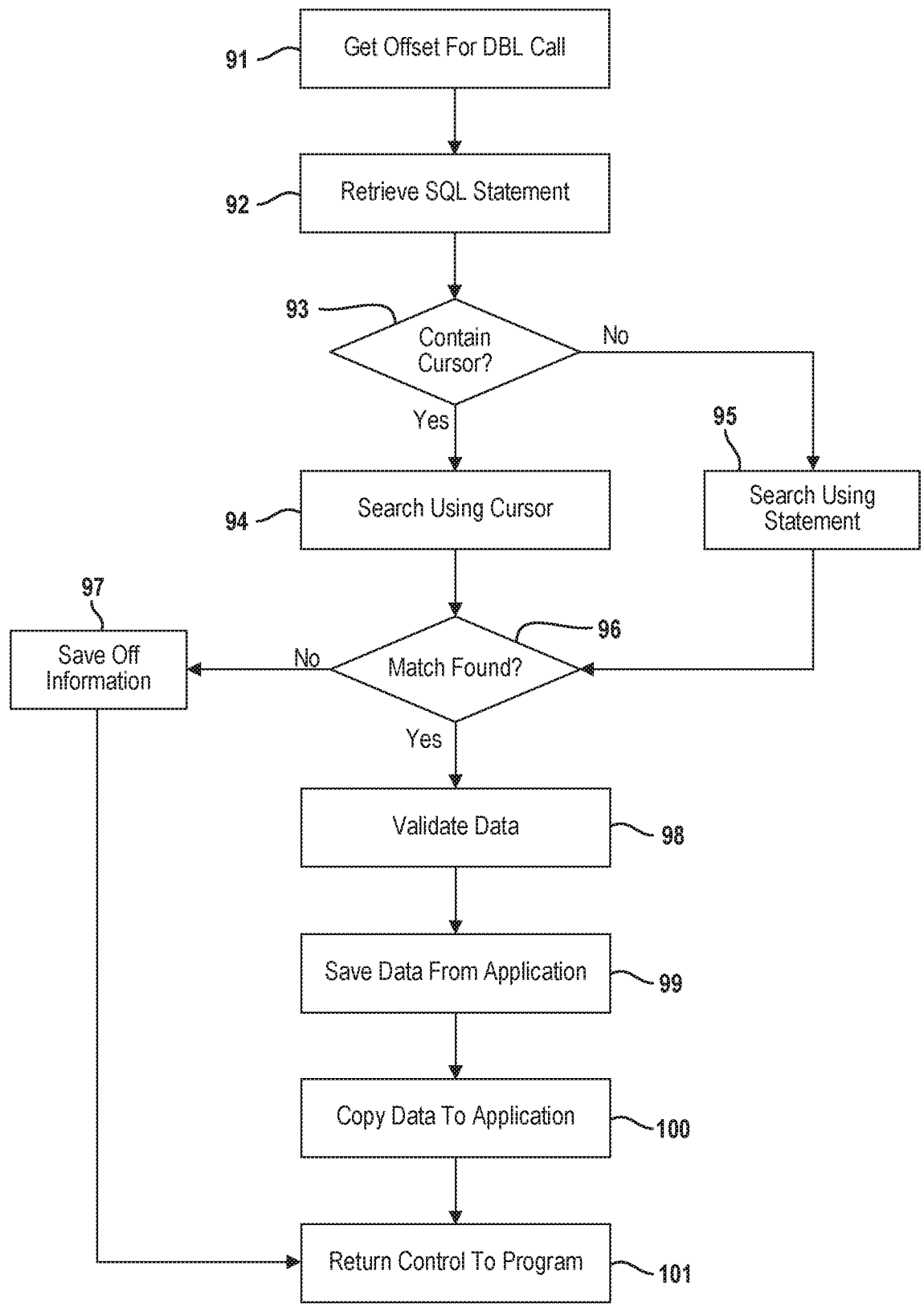

FIG. 3 further illustrates the system for running a unit test of an application with one or more QSAM commands;

FIG. 4 is a flowchart for an example implementation for a stub setup routine;

FIG. 5 is a flowchart for an example implementation for a QSAM Open interceptor;

FIG. 6 is a flowchart for an example implementation for a QSAM Read interceptor;

FIG. 7 is a flowchart for an example implementation for a QSAM Write interceptor;

FIG. 8 is a diagram further illustrating the system for running a unit test of an application with one or more DB2 commands;

FIG. 9 is a flowchart for an example implementation for a DB2 interceptor; and

FIGS. 10A and 10B depict an example report produced by the development tool.

Corresponding reference numerals indicate corresponding parts throughout the several views of the drawings.

DETAILED DESCRIPTION

Example embodiments will now be described more fully with reference to the accompanying drawings.

Figure 1:
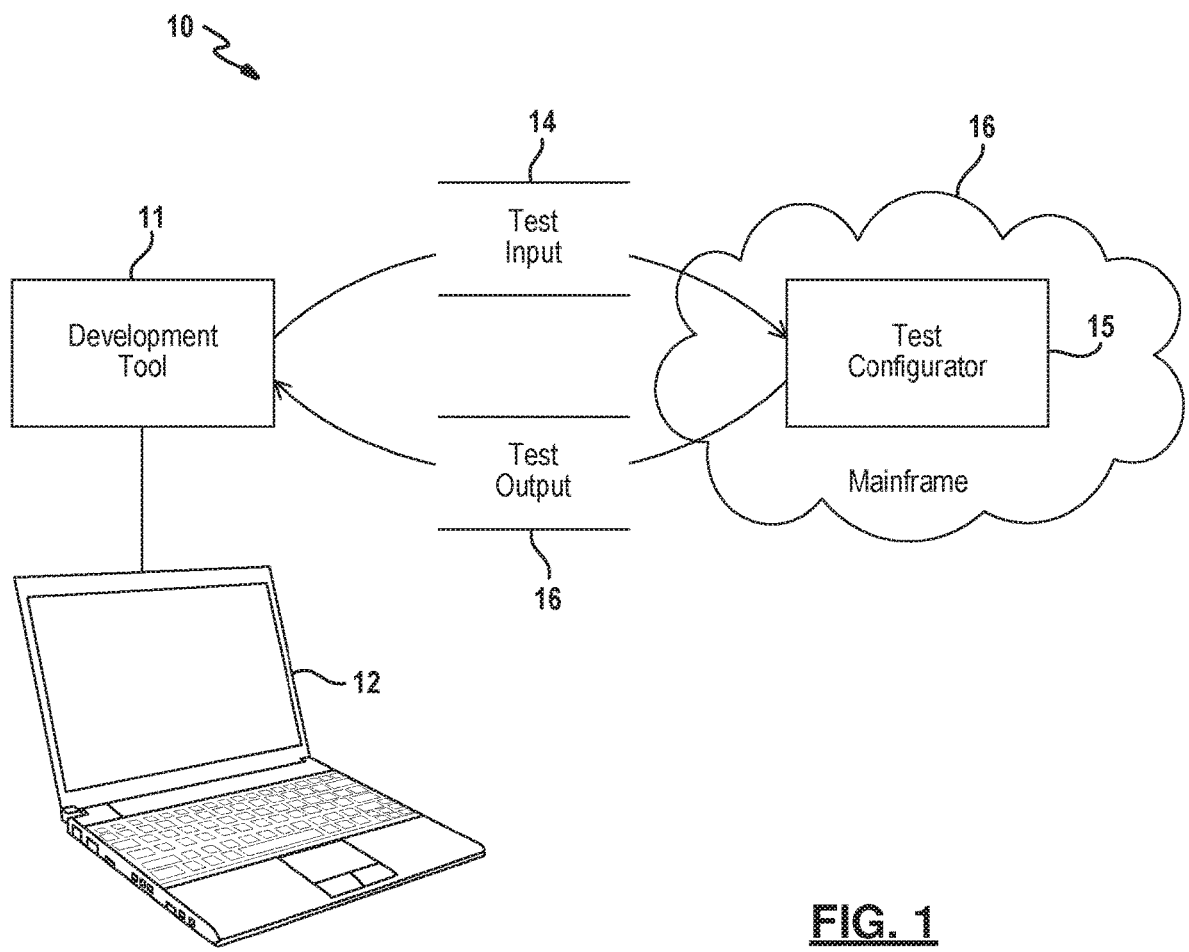
FIG. 1 is a diagram of an automated system for unit testing an application in a mainframe execution environment.

FIG. 1 depicts an example of an automated system 10 for unit testing an application in a mainframe execution environment. In this example, an integrated development tool 11 resides on a desktop computer 12. For a given test scenario, a test input file 14 is uploaded to a test configurator 15 residing in the mainframe test environment 16. A unit test of the application is then run in the mainframe test environment and thereby produces test results captured in a test output file 16. The test output file 16 is downloaded by the test configurator 15 back to the desktop computer 12 for validation. Creation, starting mainframe execution and validation of unit testing applications is implemented by the integrated development tool 11 as will be further described below. In one embodiment, the integrated development tool 11 is the Topaz Workbench mainframe application development tool commercially available from Compuware Corporation. Functionality set forth in this disclosure may be integrated into this development tool as well as other development tools.

Creation of a test scenario for a unit test can be implemented in different ways. In one example, automation of a test case is achieved using a debugging tool, such as Xpediter debugging tool. After launching a debug session in the mainframe environment, the user will invoke a test generating dialog that allows them to customize the data to be captured, and specify the project where the test case and related objects are to be saved. The projects created extend the Eclipse project framework, and organize the various data objects in subfolders. Upon closure of the dialog, the development tool 11 uses an Xpediter API service to get all the variables that are on the program's PROCEDURE USING statement. For each variable, the COBOL source definition and current value are also requested. These values are what will be used as input to the automated test case, and simulate the parameters used to invoke the target program during a unit test. While the example embodiment has been described with reference to Xpediter debugging tool, it will be appreciated that other types of debuggers fall within the scope of this disclosure.

A data stub is a computer program used to simulate retrieval of data during a unit test. Typically, the data stub is written manually and must be updated whenever the data structure of the retrieved data changes. This disclosure provides an automated technique for creating data stubs. If the user has requested to stub data during a unit test, the Xpediter API is again invoked by the development tool 11 to get a list of specific statements from the program, and then adds an execution listener for each statement. This Xpediter listener notifies its clients when a specific statement has executed. Example statements may include:

| Statement Type | Stub Type | Created by |
|---|---|---|
| CALL | Program | program name |
| READ | I/O | DD name |
| WRITE | I/O | DD name |
| EXECSQL | SQL | SQL statement |

After setup of listeners, user can resume their Xpediter debug session.

Upon notification of a statement execution event, the listeners collect the variables from the statement. What these variables are is dependent on the type of statement.
 CALL—parameters from USING statement
 READ—FROM clause or FD Section
 WRITE—TO clause or FD Section
 EXECSQL—Input/Output host variables and results Once the variables are collected, the Xpediter API is called to get the COBOL definition, and current hex values for each variable. The codepage is also captured from the mainframe connection for data conversion purposes. Once the data is complete, a service of the development tool 11 is called to actually create the stub and its related data objects.

The development tool 11 uses an EMF modeling framework to organize and save data objects to the workspace. XML schema's are used to serialize objects (e.g., .listructure) in the model. Each file type that is written to the workspace is described below.

In an example embodiment, each COBOL variable definition text gets passed to an XML converter, such as the CB2XML open source COBOL parser. An XML String is returned that has been converted to a listructure format. Some properties described in this object are:
 Storage length
 Data type
 Display length
 Redefines
 Scale
 Signed
 Synchronized The interface (.interface) is the arguments used for a particular call, and simulates what the program is expecting to receive. It is comprised of one or more listructure objects in a specific order. The usage of each listructure can be defined in the interface as "in", "out", or "in/out", based on how they are used by program.

Once the listructure and interface have been created, the hex data that has been captured in the Xpediter debug session is mapped to the underlying structures. Each field in the interface gets a unique id that is used in the creation of a persistent data object that is put into each stub. The organization of data is as follows:

```
<Stub>
  <StubData> one per statement execution instance
    <Interface>
        <Output>
            <Persistent Data...>
```

Binary data converted to hex data
Hex data converted to displayable string character based on underlying listructure

```
<Property>
        Value - converted displayable string character
</Property>
            <Check Conditions>
```

For stubs that will be used for assertions (WRITE/SQL UPDATE/INSERT), check conditions are created from value properties.

Each execution of a statement will add a "record" to a stub, in the form of a stubdata object. In the case of a Program, this means recording data for each call to a subroutine. For a READ/WRITE, this results in a simulation of a data record from/to a dataset. For an EXECSQL, there may be multiple records for each SQL statement as further described below.

At the end of the debugged program, the Xpediter API service will notify its listeners that the program has ended. The variables initially collected at the beginning of the program are once again interrogated for current values that will be used to create assertions for the test case. This results in both input and output data for a given test case. All stubs that were created during program execution are added to the newly created test case (.testscenario). The test scenario file holds one or more test cases, which each execute a target program.

```
<test scenario>
    <testcase>
        <interface>
```

-continued

```
        <input>
            <Persistent Data...>
```

Input binary data from beginning of capture converted to hex
data converted to displayable string character based on underlying liststructure

```
    <Property>
        Value - converted displayable string character
    </Property>
                <Check Conditions>
``` output binary data from end of program converted to hex data
hex data converted to displayable string character and check condition created from value
<stubs>
list of stubs to be included in testcase execution In this way, a test scenario for a unit test can be created using, for example the Xpediter debugging tool.

Figure 2:
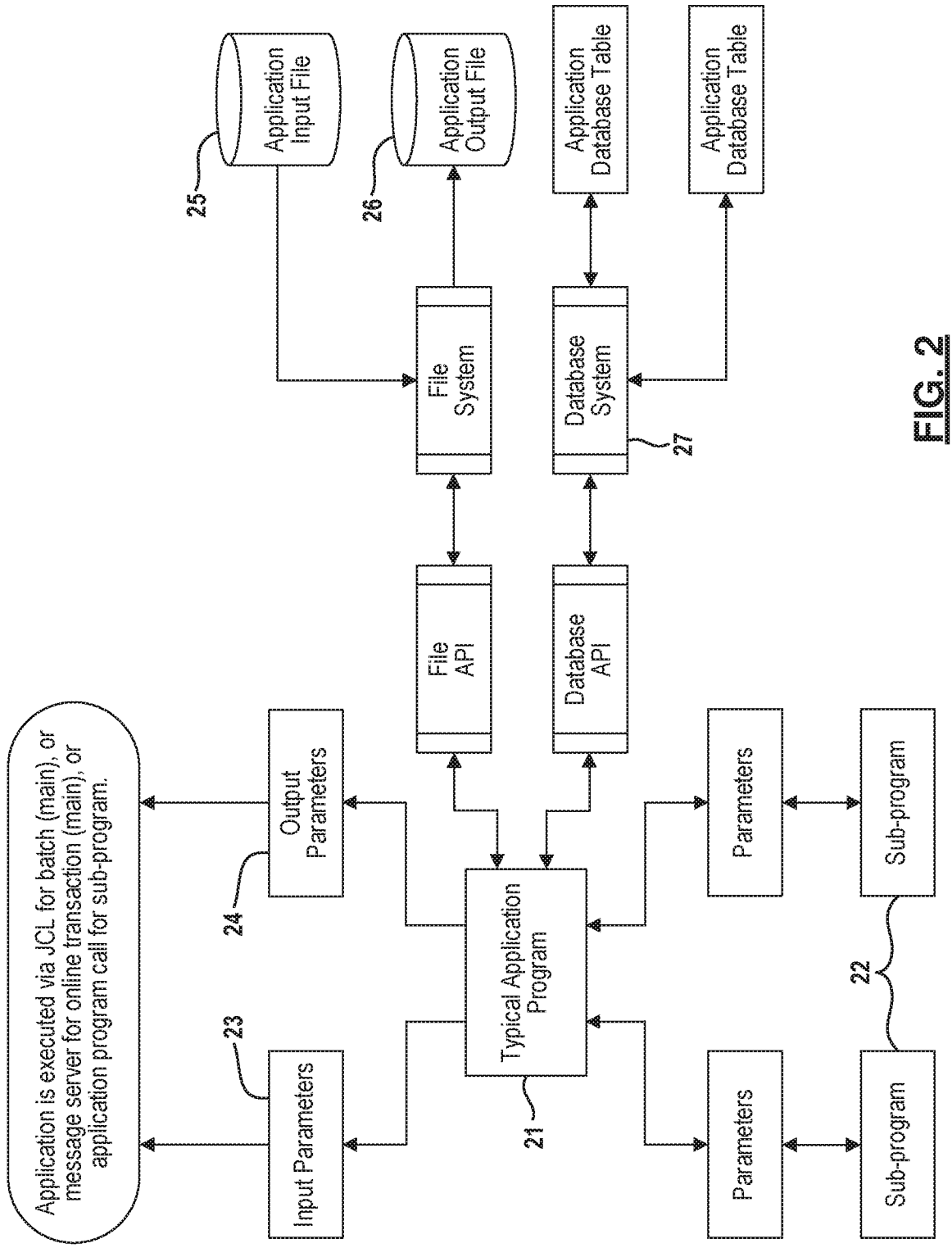
FIG. 2 is a diagram depicting a typical application program in a mainframe environment.

Running a unit test in a mainframe environment is further described in relation to FIG. 2. For illustration purposes, the test is run in a z/OS mainframe system. Running a unit test on a z/OS mainframe system is done by submitting a file containing lines of Job Control Language (JCL) to the operating system (i.e., z/OS). JCL tells the operating system the name of an application program 21 to launch as well as where to find the application program 21 and its subprograms 22. JCL also specifies where to retrieve input parameters 23 and store output parameters 24, the names of input data files 25, the names of output data files 26, and information needed by databases 27 and other sub-systems accessed by the application. Other operating systems employ similar mechanisms to launch a program and provide it the resources needed for it to run. While reference is made throughout this application to a particular mainframe environment, it is readily understood that the concepts presented in this disclosure are applicable to other mainframe or non-mainframe computing environments as well.

When a test scenario is about to run, the information referenced by the test scenario is gathered from the definitions in the liststructure, interface, stub that it references. This information is then converted into a single test input file containing all of the data to run the test.

FIG. 3 further illustrates the system 30 for running a unit test of an application 31 in the mainframe environment. In the context of z/OS, a runtime provided vector table provides a list of command handlers. When the application 31 includes one or more commands for a given type of file system, each command may have an entry in the vector table 32 with an address to a handler for the corresponding command. A vector table is associated with the application, such that the application includes one or more commands for a given type of file system, for built-in functions and for calls to dynamically loaded application sub-programs and each command has an entry in the vector table with an address to a handler for the corresponding command. Additional vectors are associated with the application, compiler-generated within the program's constant storage, such that the application includes one or more commands for database access, for online transaction processing and for calls to statically linked application sub-programs and each command has a vector in constant storage with an address to a handler for the corresponding database or transaction command or to the application sub-program entry point. The test configurator further operates to update an entry in a vector table or a constant storage vector for the given command by replacing the address to a handler for the given command or called sub-program entry point with an address for the interceptor routine. A vector table vector entry's location in memory is known by its fixed offset within the table. A compiler-generated constant area vector's location in memory is known by calling a system-provided service (e.g., IBM Binder API) to provide location offset information and then using that offset information to calculate the vector's location in memory.

Alternatively, a command may have a vector located in a prescribed location other than the runtime vector table. For illustration purposes, the application 31 is described as having commands for accessing data files in accordance with queued sequential access method (QSAM). Example commands for QSAM may include but are not limited to Open, Read and Write commands. Techniques set forth below are readily extendable to other types of file systems, such as VSAM.

A test configurator 32 orchestrates the running of the unit test in the mainframe environment. In this regard, the test configurator 32 is configured to receive and parse a test input file 14 which describes the test scenario. The test input file 14 will include input parameters 23 for initializing the application 31. The test configurator 32 operates to retrieve values for the input parameters from the test input file 14 and pass the values of the input parameters to the application 31, thereby initializing the application 31. The test configurator 32 then calls the application 31 to initiate unit testing of the application. Upon completing the unit test, the test configurator 32 likewise retrieves values of the parameters 24 from the application 31 and generates the test output file 16.

Prior to initiating a unit test, the test configurator 32 creates the testing environment for the application 31. To do so, the test configurator 32 parses each record in the test input file and processes the record accordingly. The test input file 14 may include one or more records for particular files accessed by the application 31 using the given type of file system. Upon reading a particular record for a particular file, the test configurator 32 calls a stub setup routine 33. In one embodiment, each type of file or type of file system will have a corresponding stub setup routine 33. In FIG. 3, the stub setup routine is designed for data files accessed using QSAM. An example implementation of the stub setup routine is further described below.

For a particular file, the stub setup routine 33 creates an object for the particular file in the mainframe execution environment, such that the object is instantiated from a class representing the given type of file. For example, the application may access File A and File B during execution of the unit test. The test input file 14 will contain a record for File A and a record for File B. The QSAM setup routine 33 in turn instantiates an object 34 representing File A and a second object 35 representing File B. During the unit test, the objects serve as data stubs to simulate retrieval or updating of data by the application 31 as will be further described below.

The test input file 14 may also include data records for a particular file. The data records specify data which can be used to populate a newly instantiated object. Upon reading a data record from the test input file 14, the test configurator 32 operates to populate the corresponding object with data from the data record. That is, data records pertaining to File A will be used to populate object 34; whereas, data records pertaining to File B will be used to populate object 35.

During unit testing of the application, the application 31 will execute one or more commands for accessing a given type of file. Continuing with the example set forth above, the application 31 may execute an Open, Read or Write command for access to QSAM File A. When the application 31 executes a given command, control is passed to an interceptor routine made accessible to the application 31. For an Open command, control is passed to an Open interceptor 36 for QSAM. For a Read command, control is passed to a Read interceptor 37 for QSAM. For a Write command, control is passed to a Write interceptor 38 for QSAM. In the example embodiment, each command for a given type of file has a dedicated interceptor. In other embodiments, different commands for a given type of file system may be handled by the same interceptor. In any case, the interceptor interacts with methods provided by the corresponding object to simulate accessing the data encapsulated by the object.

FIG. 4 further illustrates an example implementation for a stub setup routine. In the example embodiment, each type of data store has a dedicated stub setup routine. By way of example, a dedicated stub setup routine is created for QSAM and another dedicated stub setup routine is created for VSAM and yet another dedicated stub setup routine is created for DB2 and/or IMS. It is readily understood that a dedicated stub setup routine is created for each type of data store supported by the system.

During parsing of the test input file, a first occurrence of a file record for a particular file will trigger a call by the test configurator 32 to the applicable stub setup routine 33. The stub setup routine 33 begins at 41 by creating an object for the particular file, where the name of the particular file is identified in the record. The file record is followed by one or more data records for the particular file. For instance, if the initial state for QSAM File A calls for 10 records, the file record for File A will be followed by ten data records. Each data record contain data for one record in the file and thereby defines an initial state for the file. These data records are also read by the stub setup routine. Data contained in each data record is used by the stub setup routine at 42 to populate the newly instantiated object for the file.

The stub setup routine 33 also creates the link between the application and each of the applicable interceptor routines as indicated at 43. For files, the stub setup routine 33 updates one or more entries in a vector table associated with the execution environment. In the context of z/OS, each access command for a given type of file system has an entry in the vector table 32 with an address to a handler for the corresponding command. It may be necessary to determine the addresses for the vector table and other prescribed vector locations by accessing different control blocks, such that the common anchor area (CAA), the task global table (TGT) and the file control block (FCB). Once identified, the stub setup routine 33 replaces the address for the conventional handler with an address for the applicable interceptor routine. Although not limited thereto, the address for a given handler can be determined from a compiler listings or other empirical methods.

Continuing with the QSAM example, the entry in the vector table for an Open command is replaced with an address to the Open QSAM interceptor, the vector entry in the file control block for the Read command is replaced with an address for the Read QSAM interceptor, and so on. In this way, control is passed to the applicable interceptor during unit testing seamlessly and without modifying source code of the target application.

For databases, the system 30 is configured with one interceptor for each type of database. That is, DB2 statements will be handled by a DB2 interceptor; whereas, IMS commands will be handled by an IMS interceptor. In the case of DB2, DSNHLI is the name of the interface for DB2 database management system. To create the link between the application 31 and a DB2 interceptor, the Binder API is used by the stub setup routine to retrieve an offset in the VCON for the address of the DSNHLI interface. Given this offset, the address for the DSNHLI interface can be replaced with an address for the DB2 interceptor. Similar methods can be used to link interceptors for other types of databases. It is to be understood that only the relevant steps of the stub setup routine are discussed in relation to FIG. 4, but that other software-implemented instructions may be needed to implement the stub setup routine.

Once the records for a particular file have been processed by the stub setup routine 33, control is returned to the test configurator 32. The test configurator 32 continues processing the remaining records in the test input file. In the event another file record is read for a different type of file system (e.g. VSAM or DB2 or IMS), the test configurator 32 again passes control the applicable stub setup routine associated with the type of file system. Once all of the records in the test input file 14 have processed, the test configurator 32 calls the target application 31 and begins the unit test.

During unit testing, the application 31 will execute one or more commands for accessing a given type of file. When executed, control is passed from the application 31 to an applicable interceptor for example, using the address for the interceptor found in the vector table. Example implementation for different types of interceptors are set forth below.

FIG. 5 further illustrates an example implementation for a QSAM Open interceptor 36. As a starting point, the Open interceptor 36 learns the name of the file being open as indicated at 51. In an example embodiment, the name of the file being opened, along with an address for the corresponding file information block (FIB), can be retrieved from the file control block. The interceptor then retrieves information for the file at 52, for example from the corresponding file information block. Information retrieved for the file may include but is not limited to record length for the file as well as addresses for the Read, Write and Rewrite QSAM handlers.

Next, a reference for the data stub object is stored at 53 in a control block for subsequent use. In the example embodiment, the FSYSCBAL field in the file control block, which normally holds the address of a file's data control block, may be used to store an address for the data stub object (e.g., object 34 for QSAM File A). It is envisioned that other fields may be used to hold a reference to the data stub object.

To simulate interactions with a QSAM file, the Open interceptor 36 also needs to provide certain information back to the target application 31. In step 54, the Open interceptor 36 retrieves an address for a pointer to an I/O buffer used by the application when accessing the QSAM file. In step 55, the Open interceptor retrieves an address for a file status field. The file status field indicates whether a file operation was successful, unsuccessful or otherwise. The I/O buffer and the file status field will be accessed by the target application and thus need to be updated accordingly by the data stub object.

The Open interceptor now has the input parameters needed to call the open file method of the object, i.e., object 34 for QSAM file A. The open file method is called at 56. Parameters passed to the method may include but are not limited to a pointer for the file control block, a pointer for the corresponding file information block, a pointer to the I/O buffer used by the application and a pointer to the file status field for the file. Lastly, the address for the I/O buffer is passed by the Open interceptor at 57 back to target application 31. I/O buffer may or may not be simulated. If the application program provides one already, we may use it; if not, we provide a simulated I/O buffer for the stub and application to use. It is to be understood that only the relevant steps of the routine are discussed in relation to FIG. 5, but that other software-implemented instructions may be needed to implement the QSAM Open interceptor.

FIG. 6 further illustrates an example implementation for a QSAM Read interceptor 37. The input to the Read interceptor 37 is a pointer to the file control block for the QSAM file being read as indicated at 61. Additionally, the Read interceptor retrieves the reference for the data stub object (i.e., object 34 for QSAM file A) at 62 for example, from the FSYSCBAL field in the file control block. Records in the QSAM file are stored in an array maintained by the data stub object and read one record at a time. To read a record, the Read interceptor calls the read file method of the data stub object at 63 which maintains an index to the most recently read record in the array. The read file method increments the index and moves the data in the current record to the I/O buffer used by the application. The Read interceptor 37 then calls a load buffer method at 64. The load buffer method puts an address for the current record in the I/O buffer into a field in the control block so that it may be accessible to the target application. This process is repeated each time the target application executes a Read command. It is to be understood that only the relevant steps of the routine are discussed in relation to FIG. 6, but that other software-implemented instructions may be needed to implement the QSAM Read interceptor.

FIG. 7 further illustrates an example implementation for a QSAM Write interceptor 38. The input to the Write interceptor 38 is again a pointer to the file control block for the QSAM file being read as indicated at 71. The Write interceptor retrieves the reference for the data stub object (e.g., object 34 for QSAM file A) at 72 as well as retrieves the record length for the file at 73 for example, from the file control block. To write a record, the Write interceptor calls write record method at 74. The write record method copies the record written from the application's I/O buffer into the array maintained by the data stub object. The Write interceptor 38 also call the load buffer method at 75 which provides an address of an I/O buffer for the application to use for its next write operation. It is to be understood that only the relevant steps of the routine are discussed in relation to FIG. 7, but that other software-implemented instructions may be needed to implement the QSAM Write interceptor.

When the unit test is complete, the target application 31 returns control to test configurator 32. To validate the unit test, the test configurator 32 determines a final state following the test. Objects representing data stores are configured with methods for retrieving the data encapsulated in the object. The test configurator 32 calls the data stub for each data store accessed by the target application to retrieve the data from the data store. In particular, the test configurator 32 calls the methods provided by the objects to retrieve the data. The test configurator 32 also retrieves values of the parameters 24 from the application. All of this data represents the final state and is saved into a test output file 16 by the test configurator 32. The test output file 16 in turn transferred back to the development tool 11 on the desktop computer 12 for comparison.

When the test output data is returned from the mainframe to the development tool 11, it uses the data collected by the test configurator 32 to generate a report. The development tool 11 uses data previously captured as expected data and compares it with the data from the test configurator 32 as actual test data. The report contains comparison between the actual test data and the expected test data and highlights any discrepancies between the two values. When the values compare as expected the test is considered to have passed when the values do not compare as expected the test is considered to have failed. The report includes summary data about the pass/fail test results. After the summary section, the report is organized by test case and indicates which stubs are used in the test case. For each Write Stub or DB2 SQL stub for Update/Insert/Delete there is a section that compares the previously collected expected values to the value being written into the stubs. An example report is shown in FIGS. 10A and 10B.

Determining success or failure of a unit test requires comparing the actual output data of the application program that is target of the unit test with its expected output data. Therefore, a unit test requires a set of expected output data to be stored away and accessible. A unit test also requires a means to find and record mismatches between the expected output data and the actual output data.

Manually comparing the two sets of data, even with simple, limited sets of data, can be very time consuming, tedious, and error-prone. Finding mismatches in large, complex sets of data is nearly humanly impossible. In the proposed automated system 10 for unit testing, the development tool 11 performs the validation of the unit test. Actual output data captured in the test output file 16 are compared to expected output data maintained by the development tool 11. Reported results of comparisons should include the pass/fail status of all output data fields as well as the data fields' contents. This information should be clearly documented and saved for later consumption for a programmer to efficiently and effectively address issues causing a test to fail. Unfortunately, even when all failures have been correctly identified, adequately describing and recording them is an often overlooked, manual task. This can lead to wasted time attempting to find and fix the causes of these failures.

In some instances, the application 31 may include access commands for other types of data stores, such as a relational database. FIG. 8 illustrates how the system 30 supports an application 31 with one or more commands for a DB2 relational database. While reference is made to DB2, it is understood that techniques described below extend to other types of relational or non-relational databases as well as sub-program calls.

To support database calls, the execution listeners from the debugging tool collects additional information. For each database command, the command (i.e., SQL statement) is collected and saved as one record in the test scenario file. Some or all of the information from the DB2 parameter list is also collected and saved in another record in the test scenario file. The information collected from the DB2 EXEC SQL parameter list includes the statement type, the input host variable information, and output host variable information. An example of the DB2 parameter list is set forth below.

01 SQL-PLIST2.
05 SQL-PLIST-CON PIC S9(9) COMP-5 VALUE+ 4211712.
05 SQL-CALLTYPE PIC S9(4) COMP-5 VALUE+30.

```
05  SQL-PROG-NAME    PIC   X(8)    VALUE
    X'4B5453454C454354'.
05  SQL-TIMESTAMP-1 PIC S9(9) COMP-5 VALUE+
    443306398.
05  SQL-TIMESTAMP-2 PIC S9(9) COMP-5 VALUE+
    346822309.
05  SQL-SECTION PIC S9(4) COMP-5 VALUE+1.
05  SQL-CODEPTR PIC S9(9) COMP-5.
05  SQL-VPARMPTR PIC S9(9) COMP-5 VALUE+0.
05  SQL-APARMPTR PIC S9(9) COMP-5 VALUE+0.
05  FILLER PIC S9(4) COMP-5 VALUE+1208.
05  SQL-STMT-TYPE PIC S9(4) COMP-5 VALUE+231.
05  SQL-STMT-NUM PIC S9(9) COMP-5 VALUE+147.
05  SQL-PLIST-FLG PIC S9(4) COMP-5 VALUE+0.
05  FILLER PIC X(18) VALUE
    X'000000000000000000000000000000000000'.
```

Records are also created for SQLCA, SQLDA input and SQLDA output, respectively, in the test scenario file. A pointer to the SQLDA data block is typically found in the DB2 parameter list. Finally, a record is created for each input host variable associated with the particular SQL statement and a record is created for each output host variable associated with the particular SQL statement. It is envisioned that more or less of this information may be needed depending upon the type of SQL statement and/or the type of database.

To create the testing environment, the test configurator 32 parses each record in the test input file as described above. Upon reading a record for a database command (i.e., SQL statement), the test configurator 32 calls the applicable database setup routine 81. Unlike simpler data stores, the database setup routine 81 instantiates an object for each SQL statement executed by the tested application 31. For example, the application 31 may execute a Select statement in relation to Table A and an Insert statement in relation to Table A. An object is instantiated for each of these two statements as indicated at 82 and 83. Likewise, the application 31 may execute an Open statement and a Fetch state in relation to Table B. An object is instantiated for each of these two statements as indicated at 84 and 85. If the application 31 executes another Select statement in relation to Table A, then another object is instantiated as indicated at 86.

In DB2, cursor statements are handled as a group of statements related to each other by the cursor name. The cursor is opened, a row of data is fetched, it can optionally be updated or deleted and when all rows of data have been processed, the cursor is closed. For cursor statements, the test input file 14 will include a cursor stub record which signals a particular cursor. The database setup routine 81 instantiates a cursor object for the cursor identified in the cursor stub record. The test input file 14 will further include a record for each SQL statement associated with the cursor. For an Open statement, the database setup routine 81 instantiates a cursor result set object for the Open statement from a cursor result set class. The database setup routine 81 then creates a call object for the Open statement. Data from the DB2 parameter listing, the SQLCA, the SQLDA input and the SQLDA output is used by the database setup routine 81 to populate the call object. Similar process is done for other cursor statements, including Fetch, Update, Delete and Close statements. It is noted that the test input file will include multiple records for each Fetch statement that is executed by the application, for example in a loop. The database setup routine 81 otherwise operates as stub setup routine 33 as described in relation to FIG. 4.

In one embodiment, objects are created from a hierarchy of classes. For example, a stub class may include a cursor class and a non-cursor class. Cursor objects are instantiated from the cursor class and each has a property which is a collection of cursor result set objects. Each cursor result set object in the collection itself has a property which is collection of calls. That is, a cursor object can have multiple cursor result set objects and each cursor result set object can in turn have multiple call objects. This model allows a much greater degree of validating and reporting the correctness of SQL statements that use a cursor. It also provides a significant measure of "application understanding" to a programmer, showing processing of the set of data returned by each OPEN of a cursor and processed by FETCH, UPDATE, and DELETE statements for the same cursor until the CLOSE statement.

In an alternative embodiment, the object for a given type of SQL statement is instantiated from a class representing the given type of SQL statement. That is, objects for a Select statement are instantiated from a Select class and objects for an Insert statement are instantiated from an Insert class. In this embodiment, data from the DB2 parameter listing, the SQLCA, the SQLDA input and the SQLDA output is also used by the database setup routine 81 to populate the instantiated object.

During unit testing, the application 31 will execute one or more SQL statements. When the application 31 executes a particular SQL statement, control is passed to an DB2 interceptor 87 made accessible to the application 31. Unlike the simpler data stores, there is only one interceptor routine for each type of database. For instance, DB2 SQL statements will be handled by a DB2 interceptor; whereas, IMS DL/I statements will be handled by a different IMS interceptor.

FIG. 9 illustrates an example implementation for the DB2 interceptor 87. To begin, an offset in the COBOL program is retrieved at 91 for the intercepted DB2 call. Using the offset, the SQL statement is retrieved at 92 from the listing file for the application 31. An example of a Select SQL statement from the listing file is as follows:

SELECT EMPNO
INTO:EMPNO FROM
KT_SELCTC WHERE EMPNO=:WS-EMPNO

Blank lines, sequence numbers, comments and other extraneous information have been removed from the statement.

Next, the routine performs a search to identify the object which corresponds to the particular SQL statement. Cursor statements are handled differently than non-cursor statements. A determination is made at 93 as to whether the intercepted DB2 call is a cursor statement.

For cursor statements, a search is performed at 94 using the name of the cursor. An example of an Open SQL statement from the listing file is as follows:

EXEC SQL OPEN EMPLOYEE_CURSOR
END-EXEC.

The cursor object can be uniquely identified using the cursor name (e.g., EMPLOYEE_CURSOR).

Once the particular cursor stub object is identified, if the statement is an Open, another search is performed to identify the particular cursor result set object associated with the particular Open call. If a cursor statement other than an Open is intercepted (i. e.; Fetch, Update, Delete, or Close) then the current cursor result set object found for the prior Open is used.

To identify the cursor result set object to use for an Open, in some cases, sequential processing is used; the cursor result set object to use is the next in order. In some cases, the search query may also require the values of the Open statement input host variables to uniquely identify the cursor result set object. The technique used—sequential or query—depends on if input host variables exist or not.

Once the particular cursor result set object has been identified, the SQLcall object to use is identified as the next to use matching on statement type (FETCH, UPDATE, DELETE, CLOSE), in sequential order. This allows reporting "missing" and "extra" UPDATE and DELETE statements associated with a preceding FETCH. The DB2 interceptor 87 processes the SQLcall objects contained in a cursor result set object in the order they appeared in the test input file and thus in the order they were created by the setup routine.

For non-cursor statements, a search is performed at 95 to identify the object which corresponds to the particular SQL statement. In this case, the SQL statement text is used to search for and uniquely identify the corresponding object. For example, the type of SQL statement (i.e., Select), the name of the DB2 table (e.g., KT_SELCTC) and the selected column(s) (e.g., EMPNO) are used to search for and uniquely identify the corresponding SQL statement stub object.

Once the particular SQL statement stub object is identified, another search is performed to identify the particular SQLcall object associated with the intercepted SQL statement call. In some cases, sequential processing is used; the SQLcall object to use is the next in order. In some cases, the search query may also require the values of the input host variables to uniquely identify the SQLcall object. The technique used—sequential or query—depends on the particular SQL statement type and if input host variables exist or not. In the event the application has changed and includes an SQL statement for which an object could not be found, information for the SQL statement is saved off at 97 so that the test configurator 32 can record this occurrence in the test output file 16.

Once the SQLcall object has been found, the intercepted DB2 call is processed depending on the type of SQL statement. In most instances, data is validated in some manner at 98 by the DB2 interceptor 87. For a Select statement, the data type (e.g., decimal, character, etc.) and the length of the data can be checked. If the data type and the length match expected values, then the data can be copied from the object to application 31. For the Insert statement, the data to be inserted is validated against the data stored in the object. That is, the values of the data in the input host variables of the insert statement are compared to the corresponding values stored in the object. In the event there is a mismatch between the compared values, an error entry is logged in the test output file 16. In this way, the error is made known to the development tool 11 for further reporting. It is understood that different types of validations are performed depending upon the type of SQL statement.

Next, data is copied between the application 31 and the object. Data is first copied at 99 from the application to the object, for example values of input host variables. Data is then copied at 100 from the object to the application 31. For a Select statement, data is copied from the object to the application 31 if the data type and the length match expected values. Specifically, the values of the output host variables are copied to the addresses referred to in the parameter list stored by the object. The data copied to the application may include the return code in SQLCA and other information about the SQL call. If the data type and the length do not match expected values, then an error entry is logged in the test output file 16. In any case, control is then returned at 101 by the DB2 interceptor 87 to the application 31.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automated system for unit testing an application in a mainframe execution environment, comprising:
    a vector table associated with the application and resides in a non-transitory storage medium, where the application includes one or more commands for a given type of file system and each command has an entry in the vector table with an address to a handler for the corresponding command;
    a test configurator executing in the mainframe execution environment and configured to receive and parse a test input file, where the test input file includes a record for a particular file accessed by the application using the given type of file system;
    upon reading the record, the test configurator calls a stub setup routine, wherein the stub setup routine is associated with the given type of file system and its associated command stub simulation routines for the particular file in the mainframe execution environment, such that simulation by the command stub simulation routines is appropriate for the given type of file system; and
    an interceptor routine accessible by the application and, in response to a given command issued by the application for the given type of file system, operates to call a corresponding command simulation routines for the type of command in the application;
    wherein the test configurator further operates to update an entry in the vector table for the given command by replacing the address to a handler for the given command with an address for the interceptor routine, and the test configurator and the interceptor routine are implemented by computer executable instructions executed by a computer processor.

2. The system of claim 1 wherein the test input file includes one or more data records for the particular file and the test configurator associates the data from these records with the stub simulator routines.

3. The system of claim 1 wherein the test configuration calls the application and thereby initiates testing of the application.

4. The system of claim 2 wherein the test configurator further operates to retrieve values for parameters of the application from the test input file and pass the values of the parameters to the application.

5. The system of claim 2 wherein the application returns control to the test configurator and the test configurator retrieves values of the parameters from the application and generates a test output file, where the test output file includes the retrieved values of the parameters from the application.

6. The system of claim 5 wherein the test configurator further operates to retrieve data from the command stub simulator routine and adds the retrieved data to the test output file.

7. The system of claim 1 wherein the stub setup routine and the interceptor routine are linked with the test configurator.

8. The system of claim 1 wherein the given type of file system is further defined as one of a queued sequential access method or a virtual storage access method system.

9. An automated system for unit testing an application in a mainframe execution environment, comprising:
    an address directory maintained by an operating system of the mainframe execution environment, where the application includes one or more database commands for a given type of database system and an address for a handler for the given type of database system resides in the address directory;
    a test configurator executing in the mainframe execution environment and configured to receive and parse a test input file, where the test input file includes a record for a particular database command issued by the application against a particular table of the given type of database system;
    wherein the test configurator determines a type of command for the particular database command and selects an appropriate command stub simulation routine for the particular database command in the mainframe execution environment, such that the selected command stub simulation routine corresponds to the type of command; and
    an interceptor routine accessible by the application and, in response to the particular database command issued by the application, operates to call the selected command stub simulation routine for the particular database command;
    wherein the test configurator further operates to update the address for the handler of the given type of database system in the address directory with an address for the interceptor routine, and the test configurator and the interceptor routine are implemented by computer executable instructions executed by a computer processor.

10. The system of claim 9 wherein the interceptor routine, in response to the particular database command issued by the application, retrieves syntax for the particular database command from a listing file generated by a compiler and identifies the selected command stub simulation routine based upon the retrieved syntax.

11. The system of claim 9 wherein the test input file includes at least one corresponding record for the particular database command and the at least one corresponding record includes a parameter list for the particular database command, such that the interceptor validates parameters of the particular database command against the parameter list contained in at least one corresponding record.

12. The system of claim 9 wherein the test input file includes one or more data records for the particular table and the test configurator associates the command stub simulator routine with data from the one or more data records.

13. The system of claim 9 wherein the test configuration calls the application and thereby initiates testing of the application.

14. The system of claim 13 wherein the test configurator further operates to retrieve values for parameters of the application from the test input file and pass the values of the parameters to the application.

15. The system of claim 13 wherein the application returns control to the test configurator and the test configurator retrieves values of the parameters from the application and generates a test output file, where the test output file includes the retrieved values of the parameters from the application.

16. The system of claim 15 wherein the test configurator further operates to retrieve data from the data area associated with command stub simulation routine and adds the retrieved data to the test output file.

17. The system of claim 9 wherein the stub setup routine and the interceptor routine are linked with the test configurator.

\* \* \* \* \*